Sept. 11, 1962
A. T. SPEES
3,053,385
DISPOSABLE APPLICATOR
Filed Dec. 16, 1958
4 Sheets-Sheet 1
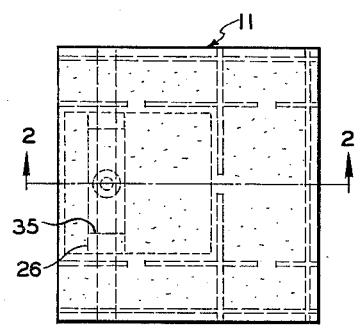
FIG. 1
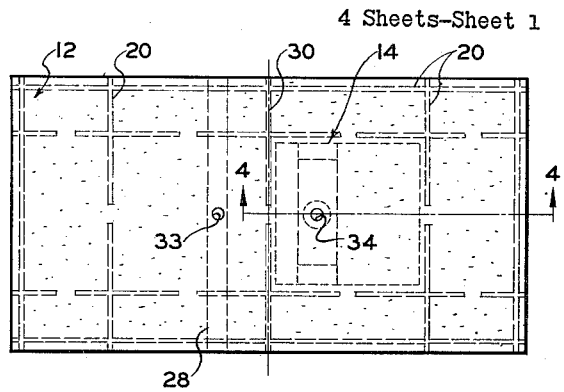
FIG. 3
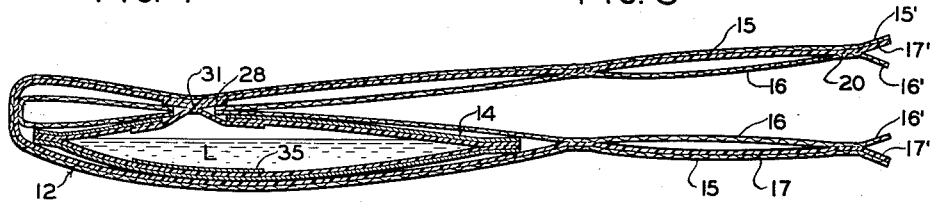
FIG. 2
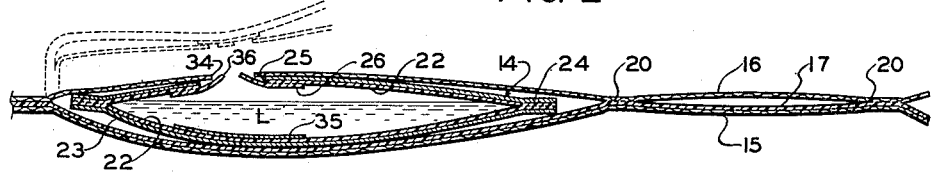
FIG. 4
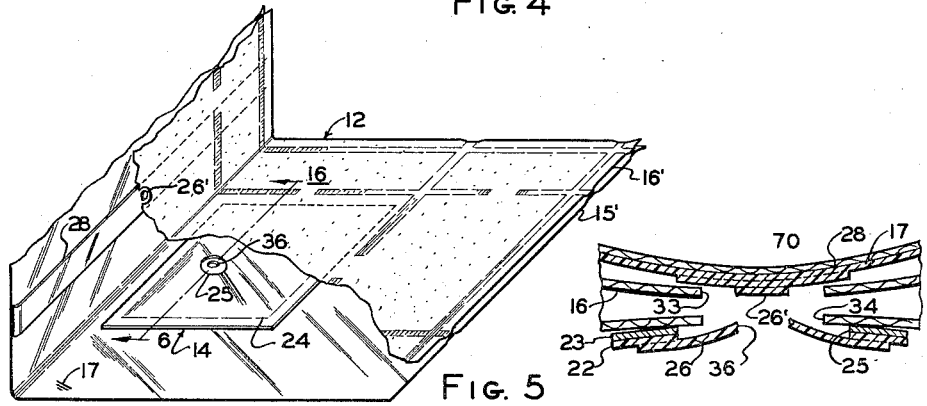
FIG. 5
FIG. 7
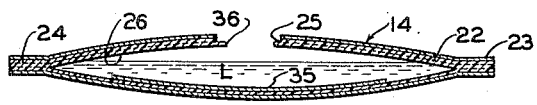
FIG. 6
INVENTOR.
ARTHUR T. SPEES
BY
*Mason & Graham*

Sept. 11, 1962 A. T. SPEES 3,053,385
DISPOSABLE APPLICATOR
Filed Dec. 16, 1958 4 Sheets-Sheet 2

INVENTOR.
ARTHUR T. SPEES
BY
*Mason & Graham*

Sept. 11, 1962   A. T. SPEES   3,053,385
DISPOSABLE APPLICATOR
Filed Dec. 16, 1958   4 Sheets-Sheet 3

INVENTOR.
ARTHUR T. SPEES
BY

Sept. 11, 1962 A. T. SPEES 3,053,385
DISPOSABLE APPLICATOR
Filed Dec. 16, 1958 4 Sheets-Sheet 4

INVENTOR.
ARTHUR T. SPEES
BY
Mason & Graham

United States Patent Office 3,053,385
Patented Sept. 11, 1962

3,053,385
DISPOSABLE APPLICATOR
Arthur T. Spees, 633 S. Carondelet St.,
Los Angeles, Calif.
Filed Dec. 16, 1958, Ser. No. 780,872
10 Claims. (Cl. 206—63.2)

This invention has to do generally with a disposable article formed largely of absorbent material and having a self-contained supply of a desired liquid or semi-liquid substance which can be manually released when required to saturate a part or all of the absorbent material and thereby ready the article for its intended use.

The application is a continuation in part of my copending application Serial No. 613,850, filed October 4, 1956, now Patent No. 2,991,000.

There are many uses for an inexpensive disposable article in the nature of an applicator made of paper or other absorbent material and containing, until ready for use, a liquid or fluid substance of desired properties which can be released to saturate the absorbent material or a predetermined part thereof. By way of example, such an article may be in the nature of a paper towel useful for a variety of cleaning operations, or in the nature of an applicator for cosmetics, or in the nature of a surgical dressing for wounds. There are innumerable other uses for such an article and I will therefore not attempt to list them.

An object of the invention is to provide a novel, disposable article, largely made of paper or other inexpensive absorbent material and having its own contained supply of a fluid substance suitable for the purpose for which the article is to be used. Further, it is an object to provide such an article which employs a relatively durable, pliable container within the article itself and means integral therewith for readily rupturing the container to release the contents for use.

More particularly it is an object to provide a novel article of the type indicated wherein one or more layers or sheets of an absorbent material, such as paper, may be used in association or combination with an impervious flexible container adapted to hold a fluid substance, together with a construction such that the container can be readily ruptured and its contents released merely by a conventional manipulation of the article itself, as by unfolding it.

A further object is to provide an article of the type indicated useful for many purposes wherein the article is so constructed that when the liquid-containing element is ruptured to release the contents, only a predetermined portion of the absorbent material of the article will be wet by the released substance, leaving the remaining portion of the absorbent substance in a dry condition for wiping or cleaning an object to which the substance is applied.

These and other objects will be apparent from the drawings and the following description. Referring to the drawings, which are merely for illustrative purposes:

FIG. 1 is a plan view of an unopened article embodying the invention;

FIG. 2 is an enlarged sectional view on line 2—2 of FIG. 1;

FIG. 3 is a plan view of the article of FIG. 1 after opening;

FIG. 4 is an enlarged fragmentary sectional view on line 4—4 of FIG. 3;

FIG. 5 is an enlarged fragmentary isometric view, partially broken away, showing the article of the previous figures;

FIG. 6 is an enlarged fragmentary sectional view of the container on line 6—6 of FIG. 5;

FIG. 7 is an enlarged detail sectional view in the plane of FIG. 2 showing the parts just after rupture of the container;

Figure 8:
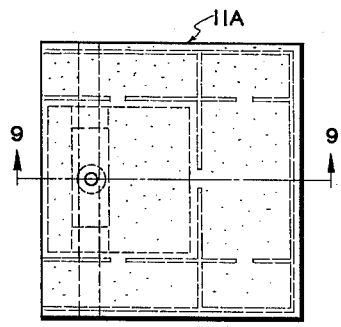
FIG. 8 is a view similar to FIG. 1 of an alternate form of the invention.
Figure 10:
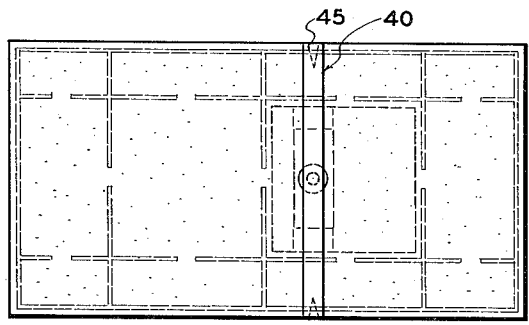
FIG. 10 is a plan view of the article of FIG. 8 shown open.
Figure 9:
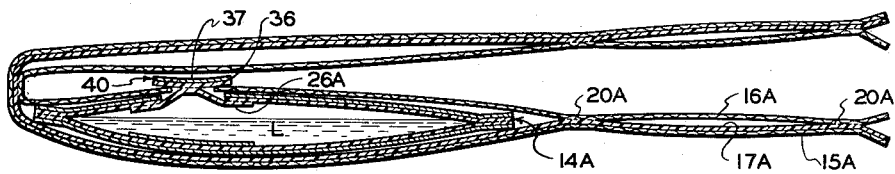
FIG. 9 is an enlarged sectional view on line 9—9 of FIG. 8.
Figure 11:
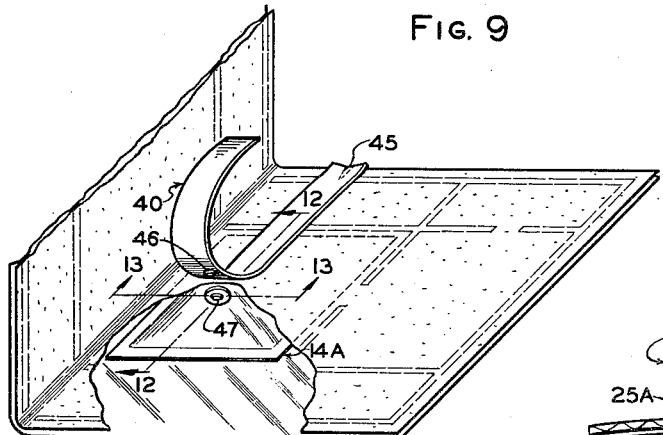
FIG. 11 is a fragmentary isometric view with parts broken away, showing the article being readied for use.
Figure 12:
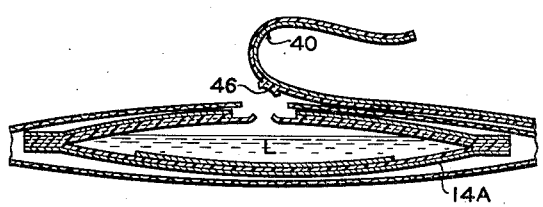
FIG. 12 is a sectional view on line 12—12 of FIG. 11, on an enlarged scale.
Figure 13:
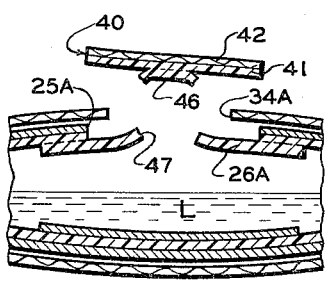
FIG. 13 is a greatly enlarged fragmentary sectional detail view in the plane of FIG. 12 showing the parts just after rupture of the container.

More particularly describing the invention, referring first to FIGS. 1 through 7, numeral 11 generally designates an article embodying the invention, the article being in the nature of a paper towel with its own supply of cleaning solution. In FIG. 1 the article is shown folded upon itself in the form in which it would be dispensed or vended, while in FIG. 3 the article is shown open, or unfolded, ready for use.

In general, article 11 comprises a body 12 formed in part at least of absorbent material and a flexible or pliable container 14 holding a liquid or semiliquid substance L of desired character. In the construction shown the body 12 is formed of an outer layer or sheet 15 of absorbent material, such as paper, an inner layer or sheet 16 of absorbent material, such as paper, and an intermediate barrier sheet 17 of a moisture-impervious or temporarily moisture-impervious material. The barrier sheet may be a separate sheet, or it may merely be a coating applied to one of the absorbent sheets or a ply laminated to one of such sheets. In the drawings, the sheet 17 is shown as a coating on or as a laminate with respect to sheet 15. To simplify the illustration, I have only shown one absorbent sheet on each side of the barrier sheet, but I contemplate that each or either absorbent sheet shown may in fact consist of several layers of absorbent material or a proportionately much thicker layer than that shown in the drawings.

The intermediate barrier sheet 17 is preferably formed of a plastics material of the thermoplastic type and the three sheets 15, 16, and 17 are joined to form a unit by means of a suitable pattern of areas 20 formed by the application of heat and pressure sufficiently to unite the absorbent sheets with the barrier sheet. If the barrier sheet is not of thermoplastic material, conventional means may be used to join the sheets.

The areas 20 marginal to the edges of the sheets are preferably spaced inwardly somewhat from the edges of the sheets 15, 16 and 17 having the edge portions 15', 16' and 17' thereof to fan out somewhat as shown in FIG. 2. This construction prevents moisture on one side of the body creeping around the edge to wet the other side as would occur if the sheets were joined clear to the edge.

The container 14 is shown as generally rectangular in configuration and as bag-like in character. This may be formed of a common laminated packaging material, such as a laminate consisting of an inner layer of a thermoplastic plastics 22 and an outer layer of a nonthermoplastic substance 23. The margins 24 of the container are heat-sealed.

A unique feature of the form of the invention shown in FIGS. 1–7 is the fact that normal manipulation of the article will serve to rupture the container 14 and thereby release its contents to wet the absorbent inner sheet 16, the container being above the barrier sheet 17. All that is required is the opening or unfolding of the article from its position of FIG. 1 to that of FIG. 3. The rupturing of the container may be accomplished in a variety of ways and in FIGS. 1–7 I show a type of means which is substantially the same as that disclosed in my above-referred-to copending application for patent. This means comprises a hole 25 in the container which is closed by an insert strip 26 of a thermoplastic plastics bonded or united to the inner layer 22 of the container. The insert 26 is integrally united with what I will term a tear strip section 28, in turn united with the barrier sheet 17 and forming a thickened, reinforced portion thereof in a region to the left of the line of fold 30 of the article as viewed in FIG. 3. If the barrier sheet 17 is not laminated to or coated upon the sheet 15, it should be joined thereto behind the tear strip 28 to further strengthen the structure. Members 26 and 28 are united in region 31 in any suitable manner, as, for example, by the application of heat and pressure, through the hole 25 in the container and through holes 33 and 34 provided in the inner sheet 16. In this connection I provide a nonthermoplastic strip 35 in the container to permit the above operation by preventing the uniting of the insert 26 with the opposite wall of the container.

When the part of the article carrying the strip 28 is pulled away from the container the superior thickness (and hence strength) of the thermoplastic material comprising sheet 17 and strip 28 as compared to the insert 26, and the reinforcement of sheet 17 and strip 28 by sheet 15, causes the insert 26 to rupture in a manner best shown in FIG. 7 of the drawing wherein a portion 26' thereof is shown pulled away leaving an opening 36 in the container for the release of its contents. In the form of the invention of FIGS. 1–7, it is merely necessary to unfold or open the article to the position of FIG. 3 to rupture the container.

In place of providing the hole 33 in sheet 16, I may provide a small body of heat sealable material which is united with the insert 26 of the container and strip 28 through sheet 16 by application of heat and pressure. While I prefer to use thermoplastic material for the container, insert 26, strip 28 and barrier sheet 17, if a nonthermoplastic plastics is used, the parts may be united by a suitable solvent or strong adhesive.

Referring now to FIGS. 8–13, I show an article 11A, which is generally similar to the article 11 previously described. In this form of the invention the parts which are the same as those in article 11 are designated by the same numerals with the distinguishing suffix "A." In this form of the invention the opening or unfolding of the article itself does not cause the rupturing of the container but rather I provide a separate means for this purpose which may be utilized at any desired time. This means comprises a laminated tear strip 40 formed of an inner or under layer 41 of thermoplastic material and an outer layer 42 of a nonthermoplastic material. The strip extends over the hole 34A in the inner sheet 16A and has its inner layer 41 united with the insert strip 26A. If desired, the strip 40 may be anchored at one end, as at 45. It will be apparent by reference to FIGS. 11, 12, and 13 that after the article has been opened or unfolded to the position of FIG. 10, the strip 40 can be grasped at one end and pulled away from the container 14 (see FIG. 11) to rupture the same by removing the wall section 46 and leaving a hole 47.

Figure 14:
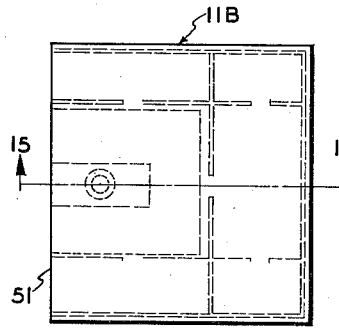
FIG. 14 is a plan view of another form of the invention.
Figure 16:
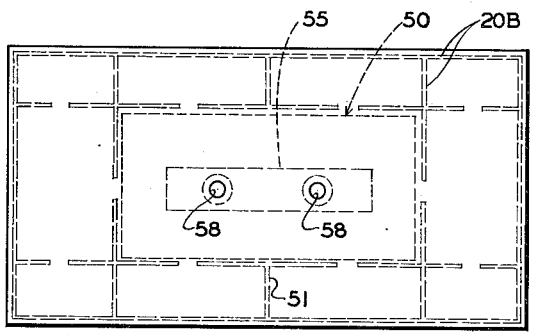
FIG. 16 is a plan view of the article of FIG. 14 after it has been opened.
Figure 15:
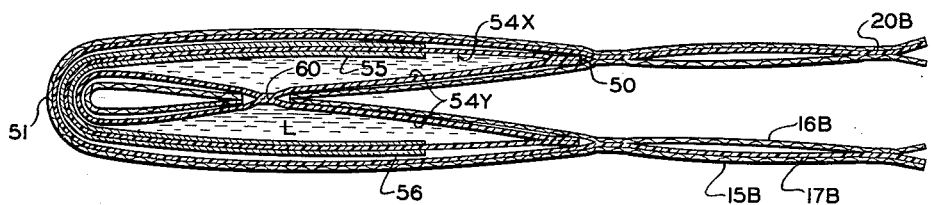
FIG. 15 is an enlarged sectional view on line 15—15 of FIG. 14.
Figure 17:
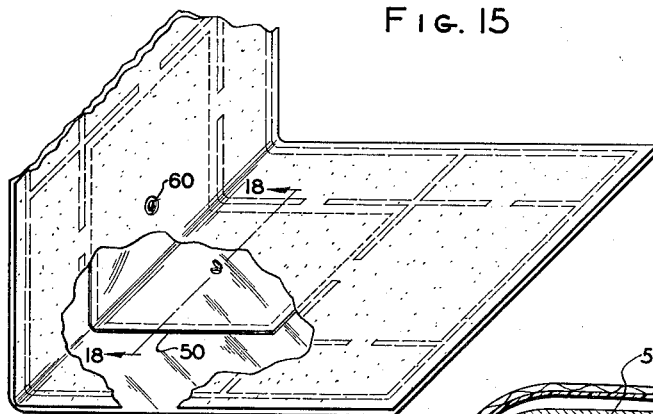
FIG. 17 is a fragmentary enlarged isometric view of the article of FIG. 14, shown partially open and with parts broken away.
Figure 19:
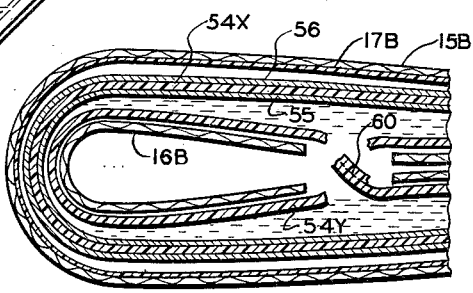
FIG. 19 is a greatly enlarged detail sectional view in the plane of FIG. 15 showing rupture of the container.
Figure 18:
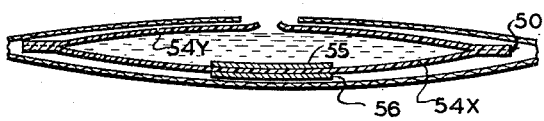
FIG. 18 is an enlarged sectional view on line 18—18 of FIG. 17.
Figure 20:
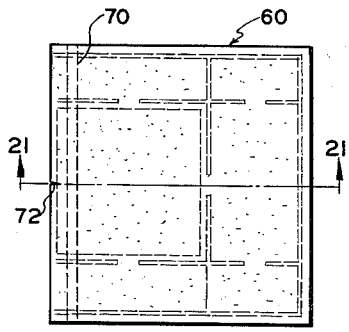
FIG. 20 is a plan view of still another form of the invention.
Figure 22:
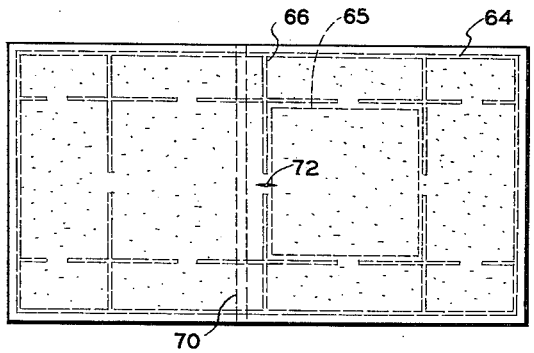
FIG. 22 is a plan view of the article of FIG. 20 after it has been unfolded.
Figure 21:
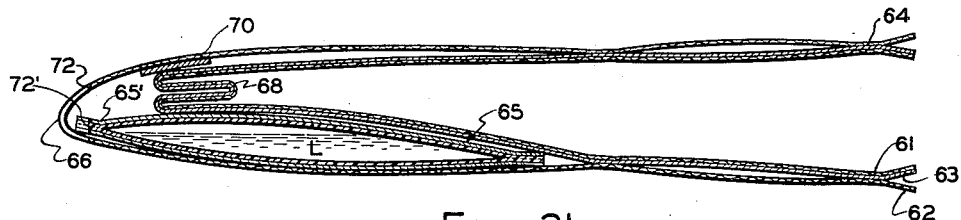
FIG. 21 is an enlarged sectional view on line 21—21 of FIG. 20.

In FIGS. 14–19 I show another form of the invention wherein an article 11B has a body formed of an outer layer 15B of absorbent material, an inner layer 16B of absorbent material, and an intermediate barrier sheet 17B of a moisture-impervious material. In this form of the invention I provide a container 50 in the form of an elongated rectangular bag which extends to opposite sides of a transverse middle fold line 51. This container is formed of a thermoplastic plastics sheet providing two wall sections 54X and 54Y, and of two strips 55 and 56 of nonthermoplastic material on the inside and outside respectively, of the wall section 54X. The inner layer 16B of the body is provided with a pair of holes 58 spaced equidistant from the transverse fold line 51 so that when the article is folded upon itself, as shown in FIGS. 14 and 15, the openings are in registration. When the article is so folded over the adjacent juxtaposed portions of wall section 54Y are united in a region of small or limited area as by application of heat and pressure, through the openings 58 to form a joined section 60. The inner nonthermoplastic strip 55 serves to permit of this joining of the two portions of wall section 54Y by the heat and pressure without causing them to join the other wall section 54X while the outer nonthermoplastic strip 56 serves to prevent the uniting of the container and the barrier sheet 17B.

It will be apparent that the container is readily ruptured in the area 60 when the article is opened by unfolding it.

Figure 23:
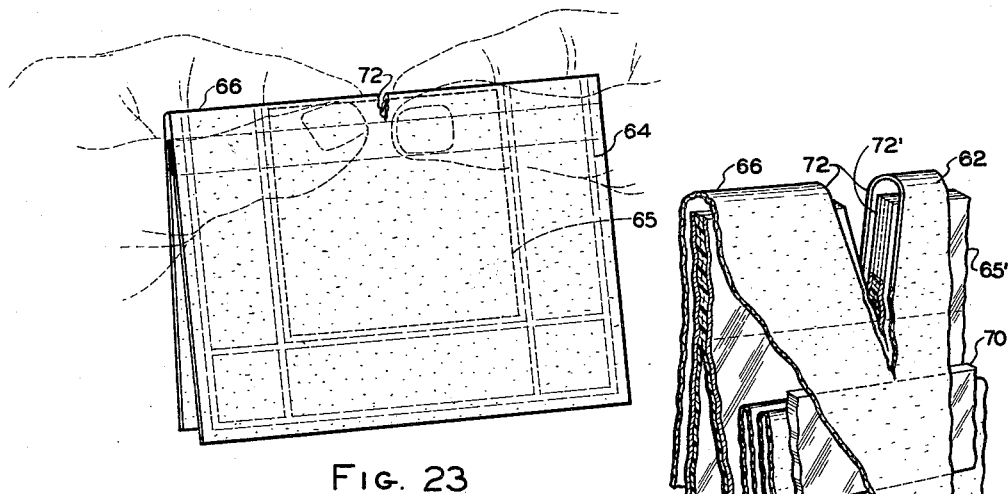
FIG. 23 is a perspective view showing the manner of rupturing the container of the article of FIG. 20.
Figure 24:
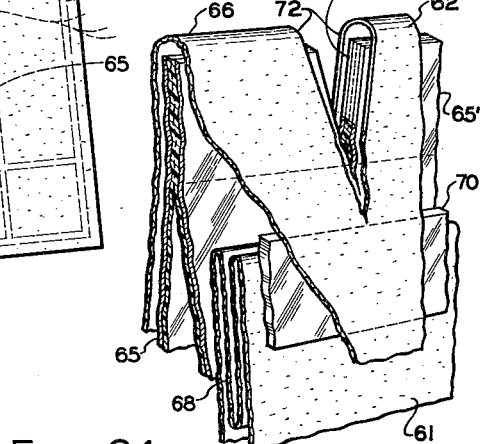
FIG. 24 is an enlarged fragmentary perspective view of the portion of the article in the region where it has been torn to open the container.

Referring now to FIGS. 20–24, I show another form of my invention wherein the article is designed to be readied for use by a simple tearing operation through the folded portion as shown in FIG. 23. As in the other forms of the invention the body of the article has inner and outer absorbent sheets, 61 and 62, respectively, with a moisture-impervious barrier sheet 63 therebetween. These are bonded together in the areas 64. A bag-like sealed container 65 is provided between sheets 62 and 63 in an area to one side of a transverse fold 66 in the sheet 62. Sheets 61 and 63 are folded upon themselves inwardly of the fold 66 to provide the accordion-like folded structure 68 thereby leaving a marginal portion 65' of the container extending therebeyond toward the fold 66. Also I provide a stop strip 70 of relatively tough tear-resistant material which extends transversely of the sheet 62 and is anchored thereto by any suitable means. The strip 70 extends laterally toward the fold 66 slightly ahead of the folded structure 68 so that when the folded marginal portion 65' of the container is torn, as in FIGS. 23 and 24, strip 70 will serve to arrest the tearing action before sheets 61 and 63 are torn. To facilitate tearing the material, I provide a slit 72 in the outer sheet 62 and a slit 72' in the edge of the container.

With the construction described, it is a simple matter to open the container and ready the article for use simply by grasping the folded edge portion of the article, as shown in FIG. 23, and tearing through the fold 66 and adjacent marginal portion 65' of the container.

In some cases it may be desirable to provide an article in which both sides are wet by the contents of the container and where this is the case, the barrier sheet may be omitted. Were this done in connection with the article shown in FIGS. 1–7, the strip 28 would have to be reinforced by other means or increased in thickness and anchored by other means than attachment to the barrier sheet. Also, where a barrier sheet is used, it need not necessarily be of plastics or be thermoplastic in character.

While I have shown and described preferred forms of my invention, I contemplate that various changes and modifications can be made therein without departing from the scope of the invention as set forth in the claims which follow. By way of example, while I prefer to use heat-sealable or joinable plastics, or thermoplastic plastics, other types may be used and a solvent or cement used to achieve a bond or uniting of the parts where required.

I claim:

1. An article of manufacture of the type described, comprising a body of absorbent material, a flexible sealed container within said body, a fluid substance in said container, and means for rupturing the container to release its contents, said means comprising a container-rupturing member having one portion secured to said body and another portion united with said container, said member being stronger than said container in the region where it is united therewith whereby the same, when pulled loose from the container, carries a portion of the container with it to rupture the same.

2. An article of manufacture of the type described comprising a body of absorbent material in sheet form, said body being folded upon itself to provide juxtaposed first and second portions, a sealed flexible container in said first portion, a fluid substance in said container, and a container-rupturing member anchored to said second portion and united with said container in a limited area thereof, effective, upon being actuated by the unfolding of said body to pull free of the container rupturing the same.

3. An article of manufacture of the type described comprising a body of absorbent material in sheet form, a sealed flexible container in said body, said body and said container being folded as a unit upon themselves whereby one portion of one wall of said container is juxtaposed relative to another portion of said wall, said juxtaposed portions of said wall of the container being united in a region of small area whereby the unfolding of said body and said container serves to open said container by rupturing at least one of the united portions of said one wall of the container.

4. An article of manufacture as set forth in claim 3 in which said container is sandwiched between absorbent sheets of said body and in which the sheet which lies between the juxtaposed portions of the container is apertured in the region where said container is united to itself.

5. An article of manufacture of the type described comprising a body of absorbent material in sheet form and a substantially moisture-impervious barrier sheet sandwiched within the absorbent material and substantially coextensive therewith, a flexible container in said body and positioned on one side of said barrier sheet, the region outwardly from said container thicknesswise of the body to the exterior surface of the adjacent moisture absorbent material being unobstructed by moisture barrier means, and means for rupturing the container including means extending through the adjacent moisture-absorbent material to the exterior thereof and integrally united with a region of small area of the container, said means being constructed and arranged whereby the same can be torn from the container.

6. An article of manufacture of the type described comprising a body having at least a pair of sheets of absorbent material, and a moisture-impervious barrier sheet sandwiched therebetween, a flexible sealed, tearable container between said barrier sheet and one of said sheets of absorbent material, said barrier sheet and said sheets of absorbent material being attached together, said body being folded upon itself in a manner such that the outermost sheet of absorbent material is folded along a margin of said container, and said barrier sheet and other absorbent sheet of said body are folded upon themselves in an accordion-like manner whereby they are positioned inwardly of said margin of said container thereby to enable the folded portion of the outermost sheet of absorbent material and said container to be torn without tearing the barrier sheet or the other sheet of absorbent material.

7. An article of manufacture as set forth in claim 6 in which said outermost sheet is provided with a transversely extending tear-resistant strip parallel to said fold and spaced therefrom, the margin of said strip nearest said fold being closer to the fold than the folded portion of said barrier sheet and other sheet.

8. An article of manufacture of the type described, comprising a body of absorbent material, a moisture-impervious sheet in said body and coextensive therewith, a flexible sealed container within said body on one side of said sheet, a fluid substance in said container, and means for rupturing the container to release its contents, said means comprising a container-rupturing member having one portion secured to said body and another portion united with said container, said member being stronger than said container in the region where it is united therewith whereby the same, when pulled loose from the container, carries a portion of the container with it to rupture the same.

9. An article of manufacture of the type described, comprising two outer sheets of moisture-absorbent material, a barrier sheet of moisture-impervious material sandwiched between said outer sheets, said outer sheets and said barrier sheet being coextensive, said outer sheets being attached to said barrier sheet in regions comprising limited areas of the sheets, said limited areas of attachment of the sheets including a continuous border area spaced inwardly from the edges of the sheets and with the marginal portions of the sheets fanned outwardly, whereby to prevent migration of moisture from one outer sheet to the other thereby to retain one outer sheet dry after said capsule has been ruptured, and a flexible container holding a fluid substance sandwiched directly between said barrier sheet and one of said outer sheets.

10. An article of manufacture of the type described, comprising two outer sheets of moisture-absorbent material, a barrier sheet of moisture-impervious material sandwiched between said outer sheets, said outer sheets being attached to said barrier sheet in regions comprising limited areas of the sheets, a flexible container holding a fluid substance sandwiched directly between said barrier sheet and one of said outer sheets, and means for rupturing said container including a member united with said container in a limited area therefor and extending through the adjacent outer sheets.

References Cited in the file of this patent

UNITED STATES PATENTS

| | | |
|---|---|---|
| 2,209,914 | Gerber | July 30, 1940 |
| 2,554,160 | Von Gunten | May 22, 1951 |
| 2,584,632 | Southwick | Feb. 5, 1952 |
| 2,676,702 | Whitefoot | Apr. 27, 1954 |
| 2,699,779 | Lustig | Jan. 18, 1955 |
| 2,760,630 | Lakso | Aug. 23, 1956 |